United States Patent Office 2,971,001
Patented Feb. 7, 1961

2,971,001

QUATERNARY SALTS OF TRIPHENYLETHANOLS, -ETHYLENES, AND -ETHANES

Frank Patrick Palopoli, Cincinnati, Ohio, Robert Edward Allen, Walnut Creek, Calif., Edward Lewis Schumann, Kalamazoo, Mich., and Marcus George Van Campen, Berkeley, Calif., assignors to The Wm. S. Merrell Company, Cincinnati, Ohio, a corporation of Delaware No Drawing. Filed Oct. 21, 1959, Ser. No. 847,700

7 Claims. (Cl. 260—294.7)

This invention relates to new chemical compounds which possess useful physiological and other valuable properties.

The new compounds of the present invention are quaternary ammonium derivatives of the formula

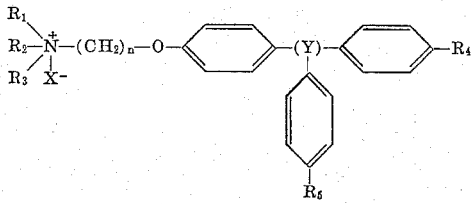

wherein $R_1$ and $R_2$ are lower alkyl radicals, or $R_1$ and $R_2$ may be joined together with N atom to form a saturated heterocyclic amino radical such as piperidino, pyrrolidino, or morpholino, $R_3$ is a lower alkyl group, $X^-$ is an anion such as halogen, sulfate, methosulfate, or toluenesulfonate, $n$ is an integer from 2 to 3, (Y) is an

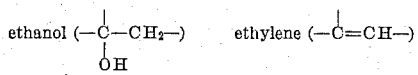

or

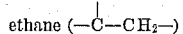

group, and $R_4$ and $R_5$ are hydrogen, lower alkyl, lower alkoxyl, halogen or perfluorinated alkyl radicals, but both $R_4$ and $R_5$ cannot be hydrogen.

The novel compounds of this invention may be prepared by quaternizing a basic compound of the formula

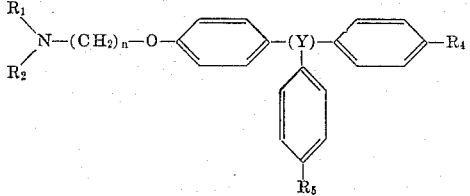

wherein $R_1$, $R_2$, $n$, (Y), $R_4$, and $R_5$ are the same as above, with a quaternizing agent of the formula $$R_3X$$

wherein $R_3$ and X are the same as above.

The substituted basic triphenylethanols, -ethylenes, and -ethanes may be prepared according to the procedure described in our respective copending applications, Serial Numbers 676,478, and 676,494, and 676,477, filed August 6, 1957, which have issued as Patent Nos. 2,914,562; 2,914,564 and 2,914,561 respectively.

The new compounds of the present invention have been found to possess valuable cardiovascular properties which produce a hypotensive response upon administration to animals. The new compounds are, therefore, useful in the treatment of hypertension and peripheral vascular disease. The new compounds also have other valuable physiological properties asuch as antihistaminic activity, and anti-cholinesterase activity which make them useful in the treatment of allergic and anaphylactic reactions and hyperactivity of the gastrointestinal and genitourinary systems.

The compounds can be used orally or parenterally in dosages ranging between 10 mg. and 2 g. daily depending upon the condition being treated.

The compounds will be further illustrated by the following examples.

EXAMPLE I

1-[p-(β-diethylaminoethoxy)phenyl]-1-(p-tolyl)-2-(p-chlorophenyl)ethanol ethobromide To 10 g. (0.023 mole of 1[p-(β-diethylaminoethoxy)-phenyl]-1-(p-tolyl)-2-(p-chlorophenyl)ethanol in 100 ml. of anhydrous benzene was added 5 ml. of ethyl bromide. The solution was refluxed for 2 days during which time a while solid separated. The precipitated solid was recrystallized from a mixture of isopropyl alcohol and ethyl acetate to give 6.0 g. of the desired 1-[p-(β-diethylaminoethoxy)phenyl]-1-(p-tolyl) - 2 - (p-chlorophenyl)ethanol ethobromide which decomposed at 202° C.

EXAMPLE II

1-[p-(β-diethylaminoethoxy)phenyl]-1-phenyl-2-(p-methoxyphenyl)ethanol ethobromide To 8.2 g. (0.02 mole) of 1-[p-(β-diethylaminoethoxy)-phenyl]-1-phenyl-2-(p-methoxyphenyl)ethanol in 100 ml. of chloroform was added 3.3 g. (0.03 mole) of ethyl bromide. The solution was refluxed for 3 hours and the solvent removed. The residue was crystallized from a mixture of isopropyl alcohol and diethyl ether to give the desired 1-[p-(β-diethylaminoethoxy)phenyl]-1-phenyl-2-(p-methoxyphenyl)ethanol ethobromide, which decomposed at 93° C.

EXAMPLE III

1-[p-(β-dimethylaminoethoxy)phenyl]-1-(p-tolyl)-2-(p-chlorophenyl)ethanol methobromide To 4.1 g. (0.01 mole) of 1-[p-(β-dimethylaminoethoxy)phenyl]-1-(p-tolyl)-2-(p-chlorophenyl)ethanol in 50 ml. of methanol was added 2.5 ml. of 70% methanolic methyl bromide. The reaction mixture stood at room temperature for 72 hours and then was diluted with ethyl acetate causing a white crystalline solid to separate. After recrystallization from a methanol-ethyl acetate mixture there was obtained the desired 1-[p-(β-dimethylaminoethoxy)phenyl]-1-(p-tolyl) - 2-(p-chlorophenyl)ethanol methobromide which melted with decomposition at 140° C.

EXAMPLE IV

1-[p-(β-diethylaminoethoxy)phenyl]-1-(p-tolyl)-2-(p-chlorophenyl)ethanol methyl p-toluenesulfonate When the procedure of Example I was followed using 1 - [p-(β-diethylaminoethoxy)-phenyl] - 1-(p-tolyl)-2-(p-chlorophenyl)ethanol and methyl p-toluenesulfonate, the desired 1-[p-(β-diethylaminoethoxy)phenyl]-1-(p-tolyl)-2-(p-chlorophenyl) ethanol methyl p-toluenesulfonate was obtained as a dihydrate melting at 84–86° C.

EXAMPLE V

1-[p-(γ-piperidinopropoxy)phenyl]-1 -(p-chlorophenyl)-2-(p-tolyl)ethanol methobromide When the procedure of Example III was followed using 1 - [p-(γ-piperidinopropoxy)-phenyl] - 1-(p-chlorophenyl)-2-(p-tolyl)ethanol and methyl bromide, the desired 1 - [p-(γ-piperidinopropoxy)phenyl] - 1-(p-chlorophenyl)-2-(p-tolyl)ethanol methobromide was obtained as a white solid melting at 195–196° C.

EXAMPLE VI

*1-[p-(β-diethylaminoethoxy)phenyl]-1-(p-trifluoromethylphenyl)-2-(p-chlorophenyl)ethanol ethobromide*

When 1-[p-(β-diethylaminoethoxy)phenyl]-1-(p-trifluoromethylphenyl)-2-(p-chlorophenyl)ethanol replaced the ethanol in the procedure of Example I, there was obtained 1-[p-(β-diethylaminoethoxy)phenyl]-1-(p-trifluoromethylphenyl)-2-(p-chlorophenyl)-ethanol ethobromide which melted at 193° C. with decomposition.

EXAMPLE VII

*1-[p-(β-diethylaminoethoxy)phenyl]-1-(p-tolyl)-2-(p-chlorophenyl)ethylene ethobromide*

When 1[p-(β-diethylaminoethoxy)phenyl]-1-(p-tolyl)-2-(p-chlorophenyl)ethylene replaced the ethanol of Example 1 there was obtained the desired 1-[p-(β-diethylaminoethoxy)phenyl] - 1-(p-tolyl)-2-p-chlorophenyl)ethylene ethobromide which melted at 215–217° C.

EXAMPLE VIII

*1-[p-(β-diethylaminoethoxy)phenyl]-1-phenyl-2-(p-methoxyphenyl)ethylene methobromide*

When the procedure of Example III was followed using 1[p-(β-diethylaminoethoxy)phenyl]-1-phenyl-2-(p-methoxyphenyl)ethylene and methyl bromide, there was obtained the desired 1-[p-(β-diethylaminoethoxy)phenyl]-1-phenyl-2-(p-methoxyphenyl)ethylene methobromide which melted at 205–208° C.

EXAMPLE IX

*1-[p-(β-diethylaminoethoxy)phenyl]-1-(p-tolyl)-2-(p-chlorophenyl)ethane ethobromide*

When 1-[p-(β-diethylaminoethoxy)phenyl]-1-(p-tolyl)-2-(p-chlorophenyl)ethane replaced the ethanol in the procedure of Example I there was obtained the desired 1-[p-(β-diethylaminoethoxy)phenyl] - 1-(p-tolyl)-2-(p-chlorophenyl)ethane ethobromide, which melted with decomposition.

This application is a continuation-in-part of our co-pending application, Serial Number 676,478, filed August 6, 1957, now Patent No. 2,914,562.

We claim:

1. Compounds of the group consisting of those having the formula

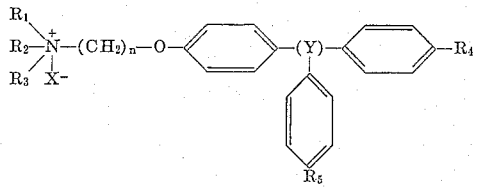

wherein $R_1$ and $R_2$ are lower alkyl radicals and $R_1$ and $R_2$ taken together with N form a heterocyclic amino radical selected from the group consisting of piperidino, morpholino, and pyrrolidino, $R_3$ is a lower alkyl radical, $X^-$ is an anion selected from the group consisting of halogen, methosulfate, sulfate and toluenesulfate, $n$ is an integer from two to three, (Y) is a radical selected from the group consisting of

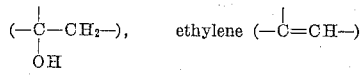

and

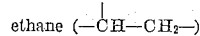

radicals, and $R_4$ and $R_5$ are selected from the group consisting of hydrogen lower alkyl, lower alkoxyl, halogen and perfluorinated alkyl radicals with the proviso that $R_4$ and $R_5$ cannot both be hydrogen.

2. 1-[p-(β-diethylaminoethoxy)phenyl]-1-(p-tolyl)-2-(p-chlorophenyl)ethanol ethobromide.

3. 1-[p-(β-diethylaminoethoxy)phenyl]-1-phenyl-2-(p-methoxyphenyl)ethanol ethobromide 4. 1-[p-(β-dimethylaminoethoxy)phenyl]-1-(p-tolyl)-2-(p-chlorophenyl)ethanol methobromide 5. 1-[p-(γ-piperidinopropoxy)phenyl]-1-(p-chlorophenyl)-2-(p-tolyl)ethanol methobromide 6. 1-[p-(β-diethylaminoethoxy)phenyl] - 1-(p-trifluoromethylphenyl)-2-(p-chlorophenyl)ethanol ethobromide 7. 1-[p-(β-diethylaminoethoxy)phenyl] - 1-(p-tolyl)-2-(p-chlorophenyl)ethylene ethobromide.

No references cited.